United States Patent
Hirosawa

(10) Patent No.: US 9,690,147 B2
(45) Date of Patent: Jun. 27, 2017

(54) LIQUID CRYSTAL DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 65 days.

(21) Appl. No.: 14/810,805

(22) Filed: Jul. 28, 2015

(65) Prior Publication Data

US 2016/0062202 A1  Mar. 3, 2016

(30) Foreign Application Priority Data

Sep. 1, 2014 (JP) .................................. 2014-177036

(51) Int. Cl.
*G02F 1/1343* (2006.01)
*G02F 1/1333* (2006.01)

(52) U.S. Cl.
CPC .. *G02F 1/134363* (2013.01); *G02F 1/133345* (2013.01); *G02F 2201/121* (2013.01); *G02F 2201/128* (2013.01)

(58) Field of Classification Search
CPC ......... G02F 1/134363; G02F 1/133345; G02F 2201/128; G02F 2201/121; G02F 1/133707
USPC .................................................. 349/139–141
See application file for complete search history.

(56) References Cited

U.S. PATENT DOCUMENTS

| 6,765,641 | B1* | 7/2004 | Kubo | G02F 1/136227 |
| | | | | 349/138 |
| 7,413,318 | B2* | 8/2008 | Hsu | G02F 1/133604 |
| | | | | 349/64 |
| 8,810,764 | B2* | 8/2014 | Nishida | G02F 1/134363 |
| | | | | 349/139 |
| 2009/0033848 | A1* | 2/2009 | Oka | G02F 1/134363 |
| | | | | 349/114 |
| 2011/0234947 | A1 | 9/2011 | Hirosawa | |
| 2013/0242221 | A1* | 9/2013 | Nishida | G02F 1/1323 |
| | | | | 349/43 |
| 2014/0267997 | A1 | 9/2014 | Hasegawa et al. | |

FOREIGN PATENT DOCUMENTS

| JP | 2011-209454 | 10/2011 |
| JP | 2014-178490 | 9/2014 |

* cited by examiner

*Primary Examiner* — Hoan C Nguyen

(74) *Attorney, Agent, or Firm* — Oblon, McClelland, Maier & Neustadt, L.L.P.

(57) ABSTRACT

A first interlayer insulating film is arranged on a gate line and a source line. A first common electrode includes a first sub-common electrode extending in a first direction so as to face the gate line and a first main common electrode extending in a second direction so as to face the source line on the first interlayer insulating film. The first common electrode has a slit extending in the second direction. A second interlayer insulating film covers the first common electrode. A main pixel electrode extends in the second direction on the second interlayer insulating film so as to face the slit. A second common electrode includes a second sub-common electrode extending on the second interlayer insulating film so as to face the first sub-common electrode and a second main common electrode facing the first main common electrode.

13 Claims, 8 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2014-177036, filed Sep. 1, 2014, entire contents of which are incorporated herein by reference.

FIELD

Embodiments described herein relate generally to a liquid crystal display device.

BACKGROUND

Recent years, in an active matrix type liquid crystal display device equipped with a switching element in each pixel, a technique to align liquid crystal molecules is proposed by forming lateral electric field or oblique electric field between pixel electrodes arranged in an array substrate and common electrodes arranged in a counter substrate, respectively. Another technique is also proposed, in which the potential of a first main common electrode extending along the source line is set to the same potential as that of a second main common electrode facing the source line to shield undesirable leaked electric field from the source line to the liquid crystal layer.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
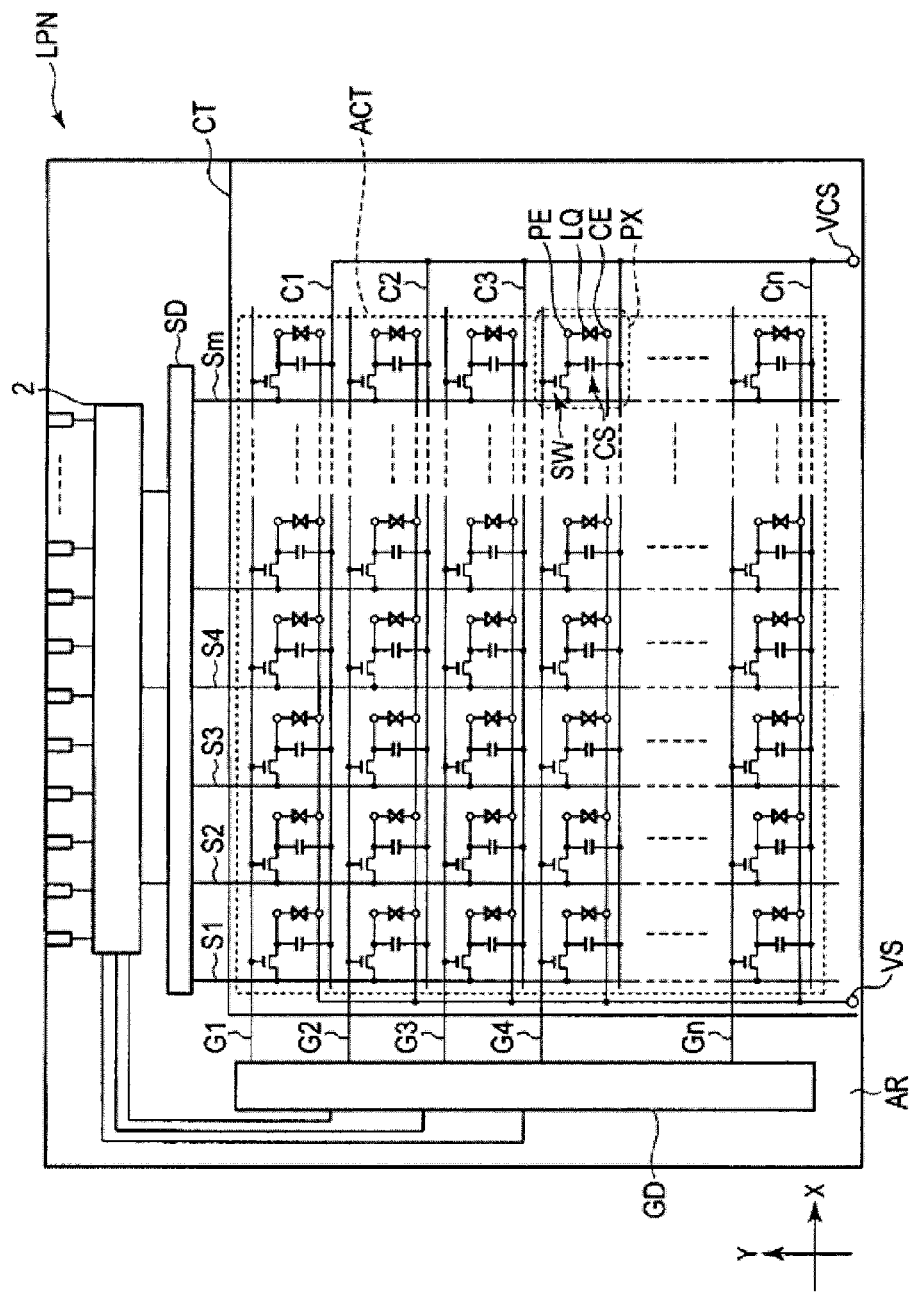
FIG. 1 is a figure schematically showing a structure and an equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device comprises: a first substrate including; a gate line extending in a first direction, a source line extending in a second direction crossing the first direction, a first interlayer insulating film arranged on the gate line and the source line, a first common electrode including a first sub-common electrode facing the gate line and a first main common electrode facing the source line extending on the first interlayer insulating film, the first common electrode having a slit extending in the second direction, a second interlayer insulating film covering the first common electrode, a main pixel electrode extending in the second direction on the second interlayer insulating film so as to face the slit, and a second common electrode including a second sub-common electrode facing the first sub-common electrode and a second main common electrode facing the first main common electrode extending on the second interlayer insulating film, the second common electrode being set to the same potential as the first common electrode, a second substrate facing the first substrate; and a liquid crystal layer held between the first substrate and the second substrate.

According to other embodiment, a liquid crystal display device comprises: a first substrate including; first and second gate lines extending in a first direction, first and second source lines extending in a second direction crossing the first direction, a storage capacitance line arranged between the first and second gate lines extending in the first direction, a first interlayer insulating film arranged on the first and second gate lines, and the first and the second source lines, a first common electrode including a first sub-common electrode facing the first and second gate lines, respectively, and a first main common electrode facing the first and second source lines, respectively, extending on the first interlayer insulating film, the first common electrode having a slit extending in the second direction, a second interlayer insulating film covering the first common electrode, a main pixel electrode extending in the second direction on the second interlayer insulating film so as to face the slit, a sub-pixel electrode electrically coupled with the main pixel electrode and extending in the first direction, the sub-pixel electrode facing the storage capacitance line, and a second common electrode including a second sub-common electrode facing the first sub-common electrode and a second main common electrode facing the first main common electrode, respectively extending on the second interlayer insulating film, the second common electrode being set to the same potential as the first common electrode, a second substrate facing the first substrate; and a liquid crystal layer held between the first substrate and the second substrate, wherein the first main common electrode extends from locations on the first and second source lines to the main pixel side respectively, partially overlapping the sub-pixel electrode so as to form the slit, and the first main common electrode is formed of a transparent conductive material.

According to other embodiment, a liquid crystal display device comprises: a first substrate including; a gate line extending in a first direction, a source line extending in a second direction crossing the first direction, a first interlayer insulating film arranged on the gate line and the source line, a first common electrode including a first main common electrode facing the source line and a capacitance portion extending in the second direction on the first interlayer insulating film, a second interlayer insulating film covering the first common electrode, a main pixel electrode extending in the second direction on the second interlayer insulating film so as to face the capacitance portion, and a second common electrode including a second main common electrode facing the first main common electrode on the second interlayer-insulating film and set to the same potential as the first common electrode, a second substrate facing the first substrate; and a liquid crystal layer held between the first substrate and the second substrate.

FIG. 1 is a figure schematically showing a structure and an equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN is equipped with an active area ACT which displays images. The active area ACT is formed of a plurality of pixels PX arranged in a matrix shape.

The liquid crystal display panel LPN is equipped with a plurality of gate lines G (G1-Gn), a plurality of storage capacitance lines C (C1-Cn), a plurality of source lines S (S1-Sm), etc., in the active area ACT. For example, the gate lines G and the storage capacitance lines C linearly extend in a first direction X, respectively. The gate lines G and the storage capacitance lines C are arranged in parallel adjacent each other along a second direction orthogonally crossing the first direction at intervals. The source lines S linearly extend in a second direction Y and cross the gate lines G and the storage capacitance lines C. The gate lines G, the storage capacitance lines C and the source lines S may not necessarily extend linearly, and a portion thereof may be crooked partially.

Each gate line G is pulled out to outside of the active area ACT, and connected to a gate driver GD. Each source line S is pulled out to the outside of the active area ACT, and connected to a source driver SD. At least portions of the gate driver GD and the source driver SD are formed in the array substrate AR, for example. The gate driver GD and the source driver SD are connected with a driver IC chip 2 provided in the array substrate AR and having an implemented controller.

Each pixel PX includes a switching element SW, a pixel electrode PE, a common electrode CE, etc. Storage capacitance CS is formed, for example, between the storage capacitance line C and the pixel electrode PE. The storage capacitance line C is electrically connected with a voltage impression portion VCS. In addition, in the liquid crystal display panel LPN that is not provided with the storage capacitance line C, the capacitance line CS may be formed between the pixel electrode PE and the common electrode CE.

The switching element SW is formed of an n channel type thin film transistor (TFT), for example. The switching element SW is electrically connected with the gate line G and the source line S. The switching element SW may be either a top-gate type or a bottom-gate type. In addition, a semiconductor layer of the switching element SW is formed of poly-silicon or amorphous silicon.

The pixel electrode PE is arranged in each pixel PX and electrically connected with the switching element SW. The common electrode CE of common potential is arranged in common to the plurality of pixel electrodes PE interposing the liquid crystal layer LQ. Furthermore, the common electrode CE is drawn to outside of the active area ACT and electrically connected with an electric power supply portion VS.

In addition, in the liquid crystal display panel LPN according to this embodiment, the pixel electrode PE and common electrode CE are formed in the array substrate AR, and liquid crystal molecules of the liquid crystal layer LQ are controlled mainly using an electric field formed between the pixel electrode PE and the common electrode CE. The electric field formed between the pixel electrode PE and the common electrode CE is a lateral electric field substantially in parallel with respect to a X-Y plane (substrate) specified by the first direction X and the second direction Y.

FIG. 2 is a plan view schematically showing a structure of one pixel when the array substrate AR shown in FIG. 1 is seen from the counter substrate side according to a first embodiment. Herein, a plan view is shown in the X-Y plane.

The array substrate AR is equipped with a gate line G1, a gate line G2, a source line S1, a source line S2, a switching element SW, a pixel electrode PE, a common electrode CE including first and second common electrodes CE1 and CE2, and a first alignment film AL1, etc.

The gate line G1 and the gate line G2 are arranged along the second direction Y at intervals and extending along the first direction X, respectively. In this embodiment, the storage capacitance line C1 is arranged substantially in the center between the gate line G1 and the gate line G2 and extends in the first direction X. The source line S1 and the source line S2 are arranged at intervals along the first direction X and extend in the second direction Y, respectively. The pixel electrode PE is arranged between the source line S1 and the adjacent source line S2. The pixel electrode PE is arranged between the gate line G1 and the adjacent gate line G2

Figure 2A:
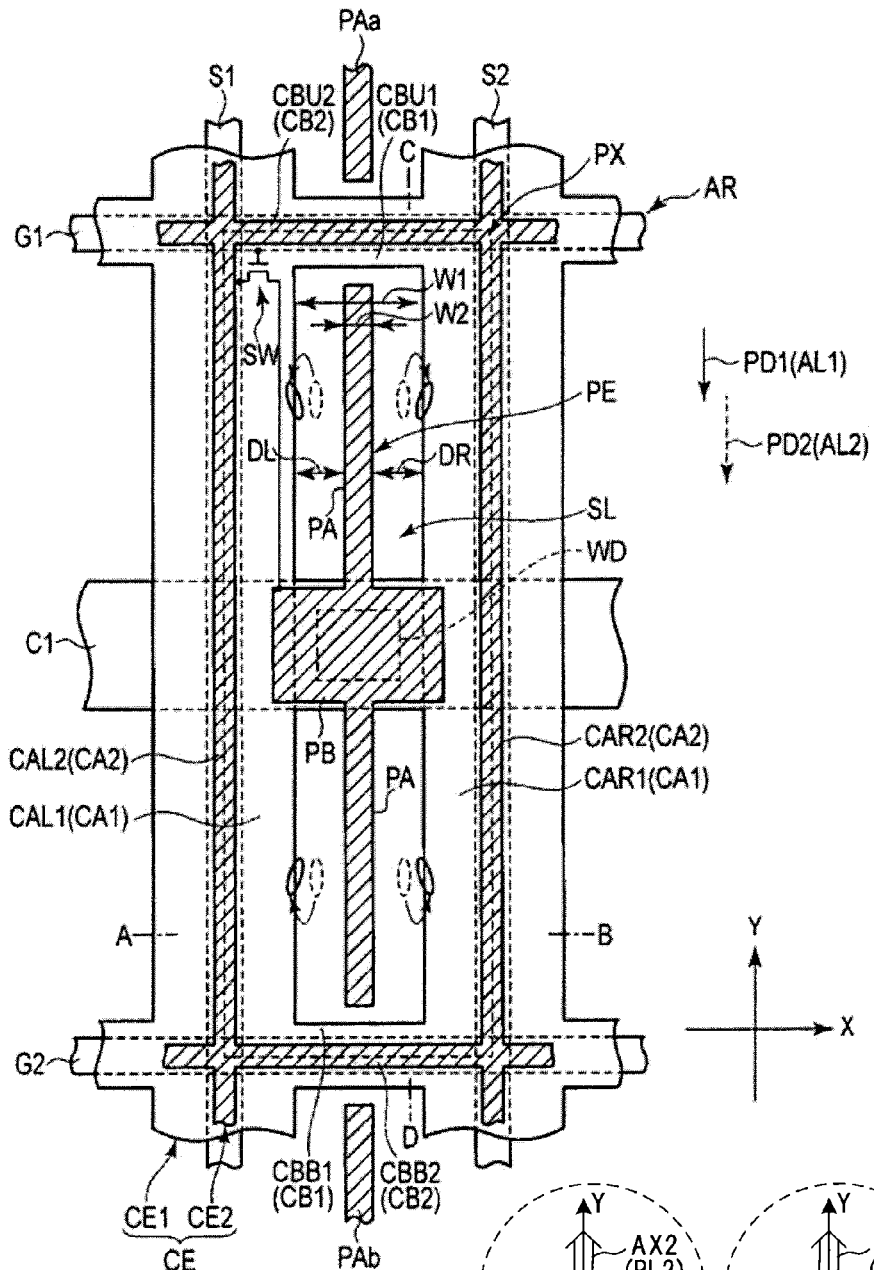
FIG. 2A is a plan view schematically showing a structure of one pixel PX when an array substrate AR shown in FIG. 1 is seen from a counter substrate side according to a first embodiment.
Figures 2B, 2C:
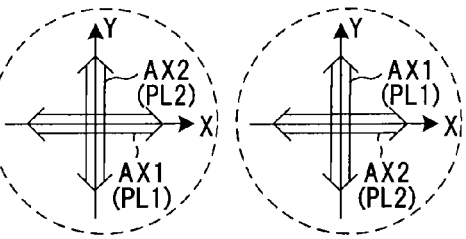
FIGS. 2B and 2C are figures showing polarizing axes, respectively.

In this embodiment, the pixel PX corresponds to a square region as shown with a dashed line in FIG. 2A, and is formed of the gate lines G1 and G2 and the source lines S1 and S2. In the square region, the length in the first direction X is shorter than the length in the second direction Y. The length in the first direction X of the pixel PX corresponds to a pitch between the source lines S1 and S2 in the first direction X, and the length in the second direction Y of the pixel PX corresponds to a pitch between the gate lines G1 and G2 in the second direction Y.

In the illustrated pixel PX, the source line S1 is arranged at the left-hand side end in the pixel PX. Precisely, the source line S1 is arranged striding over a boundary between the illustrated pixel PX and a pixel adjoining the illustrated pixel PX on the left-hand side. The source line S2 is arranged at the right-hand side end. Similarly, the source line S2 is arranged striding over a boundary between the illustrated pixel PX and a pixel adjoining the illustrated pixel PX on the right-hand side. The gate line G1 is arranged on the upper end side striding over a boundary between the illustrated pixel and a pixel arranged adjacent on the upper side, and the gate line G2 is arranged on the lower end side striding over a boundary between the illustrated pixel and a pixel arranged adjacent on the lower side. The storage capacitance line C1 is arranged substantially in the center of each pixel PX.

The switching element SW is electrically connected with the gate line G1 and the source line S1, for example. Herein, although the switching element SW is illustrated in simplified, the switching element SW includes a semiconductor layer which extends along the source line S1 and the storage capacitance line C1 so as to overlap each other, and a drain electrode WD electrically connected with the semiconductor layer. The drain electrode WD is electrically connected with the main pixel electrode PE in a location in which the storage capacitance line C1 overlaps with the semiconductor layer.

The first common electrode CE1 includes a first main common electrode CA1 and a first sub-common electrode CB1. The first main common electrode CA1 and the first sub-common electrode CB1 are integrally or continuously formed, and electrically connected mutually. The first main common electrode CA1 linearly extends along the second direction Y, and is formed in a stripe shape having substantially the same width along the first direction X. The first sub-common electrode CB1 linearly extends along the first direction X, and is formed in a stripe shape having substantially the same width in the second direction Y. Moreover, the first common electrode CE1 includes a slit SL extending in the second direction Y. The first common electrode CE1 is formed in the shape of a lattice.

The first main common electrode CA1 is formed more widely along the first direction X than the source line S while facing the source line S. In this embodiment, the first main common electrode CA1 includes a first main common electrode CAL1 located in the left-hand side end of the pixel PX and a first main common electrode CAR1 located in the right-hand side end of the pixel PX. While the first main common electrode CAL1 counters the source line S1, the first main common electrode CAL1 extends to the source line S2 side. While the first main common electrode CAR1 counters the source line S2, the first main common electrode CAR1 extends to the source line S1 side. The first main common electrode CAL1 also extends in a pixel arranged adjacent on the left side. Furthermore, the first main common electrode CAR1 also extends in a pixel arranged adjacent on the right side. The first main common electrode CAL1 and the first main common electrode CAR1 are apart from mutually. That is, the slit SL extending in the second direction Y is formed between the first main common electrode CAL1 and the first main common electrode CAR1. The width W1 in the first direction X of the slit SL is equivalent to the interval between the first main common electrode CAL1 and the first main common electrode CAR1 in the first direction X. In addition, at least a portion of the drain electrode WD of the switching element SW and the semiconductor layer counters the slit SL.

The first sub-common electrode CB1 faces the gate line G. In this embodiment, the first sub-common electrode CB1 includes a sub-common electrode CBU1 located in the upper end portion of the pixel PX and a sub-common electrode CBB1 located in the lower end portion of the pixel PX. The first sub-common electrode CBU1 faces the gate line G1. The first sub-common electrode CBB1 faces the gate line G2.

The pixel electrode PE is equipped with the main pixel electrode PA and the sub-pixel electrode PB. The main pixel electrode PA and the sub-pixel electrode PB are integrally or continuously formed, and electrically connected mutually.

The main pixel electrode PA linearly extends along the second direction Y to the circumferences of the upper end portion (the location which overlaps with the gate line G1) of the pixel PX, and to the circumferences of the bottom end portion (the location which overlaps with the gate line G2) of the pixel PX. The main pixel electrode PA faces the slit SL. Moreover, the main pixel electrode PA is located in the approximately center between the source line S1 and the source line S2 in the X-Y plane. The main pixel electrode PA is formed in a stripe shape having approximately the same width W2 along the first direction X. The width W2 of the main pixel electrode PA is smaller than the width W1 of the slit SL. That is, the main pixel electrode PA does not overlap with the first main common electrode CA1 in the X-Y plane. That is, the first main common electrode CA1 is located on the both sides sandwiching the main pixel electrode PA in the X-Y plane. The electrode interval DL in the first direction X between the main pixel electrode PA and the first main common electrode CAL1 is approximately the same as the interval DR in the first direction X between the main pixel electrode PA and the first main common electrode CAR1.

The sub-pixel electrode PB linearly extends along the first direction X to the circumferences of the left-hand end portion (the location which overlaps with the source line S1) of the pixel PX, and to the circumferences of the right-hand end portion (the location which overlaps with the source line S2) of the pixel PX. Moreover, the sub-pixel electrode PB is located in the approximately center between the gate line G1 and the gate line G2. That is, the sub-pixel electrode PB is located approximately in the center portion in the pixel PX. The sub-pixel electrode PB is arranged in the location which overlaps with the storage capacitance line C1, and crosses in the intermediate portion in the second direction Y of the main pixel electrode PA. In this embodiment, the pixel electrode PE is formed in a cross shape. Although the sub-pixel electrode PB is formed in the shape having approximately the same width along the second direction Y, the shape of the sub-pixel electrode PB is not restricted to the form in the illustrated example. The pixel electrode PE is electrically connected with the drain electrode WD in the sub-pixel electrode PB located in a location which overlaps with the storage capacitance line C1 through the slit.

The second common electrode CE2 includes a second main common electrode CA2 and a second sub-common electrode CB2. The second main common electrode CA2 and the second sub-common electrode CB2 are integrally or continuously formed, and electrically connected mutually. The second main common electrode CA2 linearly extends along the second direction Y, and is formed in the shape of a stripe having approximately the same width in the first direction X. The second sub-common electrode CB2 linearly extends along the first direction X, and is formed in a stripe shape having approximately the same width in the second direction Y. The second common electrode CE2 is formed in the shape of a lattice. The first common electrode CE1 and the second common electrode CE2 are arranged apart from the pixel electrode PE, and surround the pixel electrode PE. The first common electrode CE1 and the second common electrode CE2 are electrically connected mutually, and set to the same potential. The first common electrode CE1 and second common electrode CE2 are connected to an electric supply portion VS outside of the active area ACT.

The second main common electrode CA2 is located above the source line S, and faces the first main common electrode CA1. The width of the second main common electrode CA2 is smaller than that of the first main common electrode CA1. In this embodiment, the second main common electrode CA2 includes a second main common electrode CAL2 arranged on the left-hand side end of the pixel striding over a boundary between the illustrated pixel and a pixel arranged adjacent to the illustrated pixel on the left-hand side, and a second main common electrode CAR2 arranged on the right-hand side end of the pixel striding over a boundary between the illustrated pixel and a pixel arranged adjacent to the illustrated pixel on the right-hand side. The second main common electrode CAL2 faces the first main common electrode CAL1 right above the source line S1. The second main common electrode CAR2 faces the first main common electrode CAR1 right above the source line S2.

The second sub-common electrode CB2 is located above the gate line G and faces the first sub-common electrode CB1. The width of the second sub-common electrode CB2 is smaller than the width of the first sub-common electrode CB1. In the illustrated example, the sub-common electrode CB2 includes a second sub-common electrode CBU2 facing the first sub-common electrode CBU1 right above the gate line G1, and the second sub-common electrode CBB2 facing the first sub-common electrode CBB1 right above the gate line G2.

A main pixel electrode PAa and a main pixel electrode PAb arranged in other pixels adjoin the main pixel electrode PA in the second direction Y, respectively, and are located on the same straight line as the main pixel electrode PA. The first sub-common electrode CBU1 and the second sub-common electrode CBU2 are located between the main pixel electrode PA and the main pixel electrode PAa. The first sub-common electrode CBB1 and the second sub-common electrode CBB2 are located between the main pixel electrode PA and the main pixel electrode PAb.

In the array substrate AR, the pixel electrode PE and the second common electrode CE2 are covered with a first alignment film AL1. Alignment treatment is performed to the first alignment film AL1 along a first alignment direction PD1 to initially align the liquid crystal molecules of the liquid crystal layer LQ. The first alignment direction PD1 is substantially in parallel with the second direction Y.

In the counter substrate CT, in order to initially align the liquid crystal molecules of the liquid crystal layer LQ, alignment treatment is performed to the second alignment film AL2 along with a second alignment direction PD2. The second alignment treatment direction PD2 is in parallel to the first alignment treatment direction PD1. In this embodiment, the second alignment treatment direction PD2 is the same direction as the first alignment treatment direction PD1. In addition, the first alignment treatment direction PD1 and the second alignment treatment direction PD2 may be opposite directions mutually. Furthermore, the first alignment treatment direction PD1 and the second alignment treatment direction PD2 may be the same direction each other while they are the opposite directions to the illustrated directions.

Figure 3:
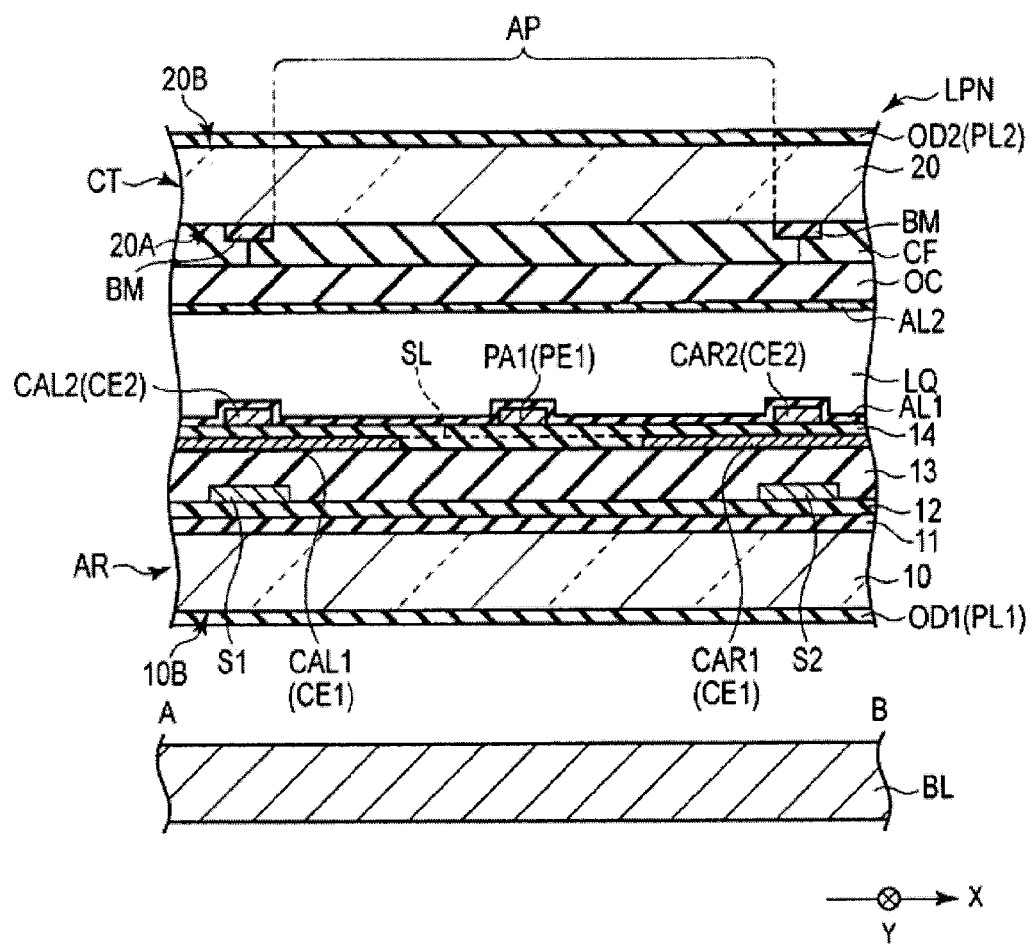
FIG. 3 is a cross-sectional view schematically showing the structure of the liquid crystal display panel LPN taken along line A-B shown in FIG. 2A.
Figure 4:
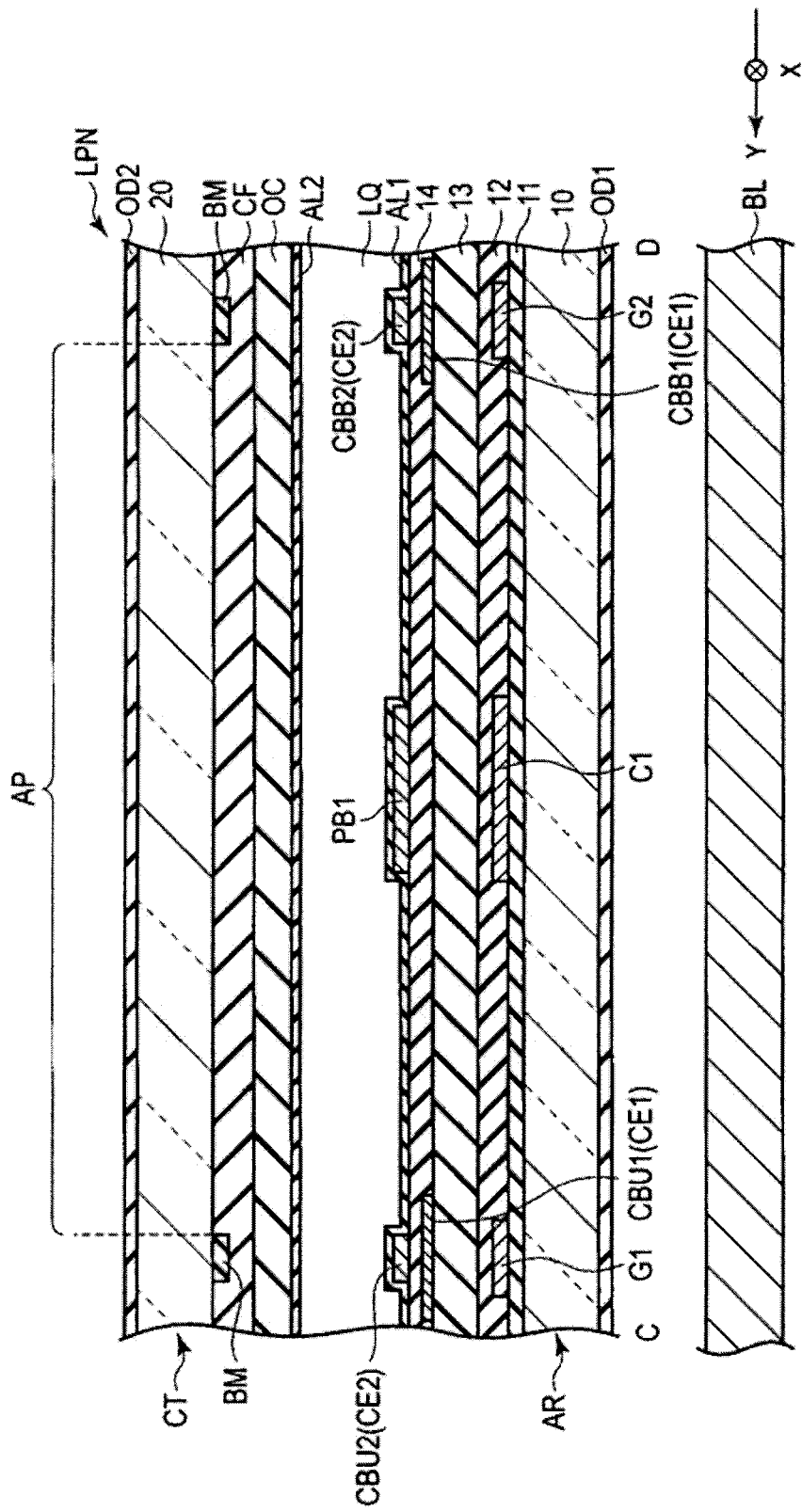
FIG. 4 is a cross-sectional view schematically showing the structure of the liquid crystal display panel LPN taken along line C-D shown in FIG. 2A.

FIG. 3 is a cross-sectional view schematically showing the structure of the liquid crystal display panel LPN taken along line A-B shown in FIG. 2A. FIG. 4 is a cross-sectional view schematically showing the structure of the liquid crystal display panel LPN taken along line C-D shown in FIG. 2A. Herein, only the portions which are necessary to explain are shown in the figures.

A backlight unit BL is arranged on the back side of the array substrate AR forming the liquid crystal panel LPN. Various types of backlight unit BL can be used, and the explanation about its detailed structure is omitted.

The array substrate AR is formed using a transparent first insulating substrate 10. The array substrate AR includes the gate line G1, the gate line G2, the storage capacitance line C1, the source line S1, the source line S2, the pixel electrode PE, the first common electrode CE1, the second common electrode CE2, a first insulating film 11, a second insulating film 12, a third insulating film 13, a fourth insulating film 14, and the first alignment film AL1, etc. on the side in which the array substrate AR counters the inner side of the counter substrate CT.

The semiconductor layer of the switching element which is not illustrated is formed between the first insulating substrate 10 and the first insulating film 11. The storage capacitance line C1, the gate line G1, and the gate line G2 are formed on the first insulating film 11, and covered with the second insulating film 12. The source line S1 and the source line S2 are formed on the second insulating film 12, and covered with the third insulating film 13. The third insulating film 13 is equivalent to a first interlayer insulating film located on the upper portion of the gate line G1 and the gate line G2, and the source line S1 and the source line S2. The third insulating film 13 is formed of a transparent resin material, for example.

The first common electrode CE1 extends on the third insulating film 13. That is, the first main common electrode CAL1, the first main common electrode CAR1, the first sub-common electrode CBU1 and the first sub-common electrode CBB1 are formed on the third insulating film 13, and covered with the fourth insulating film 14. The fourth insulating film 14 is equivalent to a second interlayer insulating film that covers the first common electrode CE1. The fourth insulating film 14 is formed thinner than the third insulating film 13, for example, and formed of inorganic system materials, such as a silicon nitride.

The first main common electrode CAL1 counters the source line S1 interposing the third insulating film 13, the first main common electrode CAR1 counters the source line S2 interposing the third insulating film 13. The first sub-common electrode CBU1 counters the gate line G1 interposing the second insulating film 12 and the third insulating film 13. The first sub-common electrode CBB1 counters the gate line G2 interposing the second insulating film 12 and the third insulating film 13.

The first common electrode CE1 is formed of transparent electric conductive materials, such as Indium Tin oxide (ITO) and Indium Zinc Oxide (IZO), for example.

The second common electrode CE2 extends on the fourth insulating film 14. That is, the second main common electrode CAL2, the second main common electrode CAR2, the second sub-common electrode CBU2 and the second sub-common common electrode CBB2 are formed on the fourth insulating film 14, and covered with the first alignment film AL1. Moreover, the main pixel electrode PA and the sub-pixel electrode PB of the pixel electrode PE are also formed on the fourth insulating film 14, and covered with the first alignment film AL1. The main pixel electrode PA is located between the second main common electrode CAL2 and second main common electrode CAR2, i.e., above the slit SL. The sub-pixel electrode PB is located between the second sub-common electrode CBU2 and the second sub-common electrode CBB2, and faces the storage capacitance line C1 interposing the second insulating film 12, the third insulating film 13, and the fourth insulating film 14. The second main common electrode CAL2 is located above the source line S1, and faces the first main common electrode CAL1 interposing the fourth insulating film 14. The second sub-common electrode CBU2 is located above the gate line G1 and faces the first sub-common electrode CBU1 interposing the fourth insulating film 14. The second sub-common electrode CBB2 is located above the gate line G2 and faces the first sub-common electrode CBB1 interposing the fourth insulating film 14.

The second common electrode CE2 and the pixel electrode PE may be formed of the same materials. For example, the second common electrode CE2 and the pixel electrode PE may be formed of transparent electric conductive materials, such as Indium Tin Oxide (ITO) and Indium Zinc Oxide (IZO) or opaque line materials, such as aluminum (Al), titanium (Ti), silver (Ag), molybdenum (Mo), tungsten (W), copper (Cu), and chromium (Cr).

The first alignment film AL1 is arranged on the array substrate AR facing the counter substrate CT, and extends to whole active area ACT. The first alignment film AL1 covers the pixel electrodes PE and the second common electrode CE2, and is arranged also on the fourth insulating film 14. The first alignment film AL1 is formed of the material which shows a horizontal alignment characteristics.

The counter substrate CT is formed using a second transparent insulating substrate 20. The counter substrate CT includes a black matrix BM, a color filter CF, an overcoat layer OC and a second alignment film AL2, etc., on an internal surface of the second insulating substrate 20 facing the array substrate AR.

The black matrix BM is formed on an internal surface 20A of the second insulating substrate 20 facing the array substrate AR and defines each pixel PX. The black matrix BM forms an aperture AP facing the pixel electrode PE. That is, the black matrix BM is arranged so that line portions, i.e., the source line S and the gate line G may face the black matrix BM. Herein, the black matrix BM includes a portion located above the source lines S1 and S2 extending along the second direction Y and a portion located above the gate line G1 and the gate line G2 extending along the first direction X, and is formed in the shape of a lattice. In addition, the second main common electrode CAL2, the second main common electrode CAR2, the second sub-common electrode CBU2 and the second sub-common electrode CBB2 are located under the black matrix BM.

The color filter CF is arranged corresponding to each pixel PX. That is, while the color filter CF is arranged in the aperture AP defined by the black matrix BM on the internal surface 20A of the second insulating substrate 20, a portion thereof overlaps with the black matrix BM. The colors of the color filters CF arranged in adjacent pixels PX in the first direction X differ mutually. For example, the color filters CF are formed of resin materials colored by three primary colors of red, blue, and green, respectively. The red color filter formed of the resin material colored in red is arranged corresponding to a red pixel. The blue color filter formed of the resin material colored in blue is arranged corresponding to a blue pixel. The green color filter formed of the resin material colored in green is arranged corresponding to a green pixel. The boundary between the adjacent color filters CF is located in a location which overlaps with the black matrix BM.

The overcoat layer OC covers the color filter CF. The overcoat layer OC eases influence by concave-convex of the surfaces of the color filter CF and the black matrix BM. The overcoat layer OC is formed of a transparent resin material, for example.

In the aperture portion AP, the region between the pixel electrode PE and the first and second common electrodes CE1 and CE2 corresponds to the transmissive region where the backlight from the backlight unit pass.

The second alignment film AL2 is arranged on the counter substrate CT facing the array substrate AR, and extends to whole active area ACT. The second alignment film AL2 covers the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin materials between the first alignment film AL1 on the array substrate AR and the second alignment film AL2 on the counter substrate CT. Thereby, a predetermined gap, for example, a 2-7 μm cell gap, is formed. The array substrate AR and the counter substrate CT are pasted together by seal material arranged outside the active area ACT, while the predetermined cell gap is formed, for example. The liquid crystal layer LQ is held in the cell gap formed between the array substrate AR and the counter substrate CT, i.e., between the first alignment film AL1 and the second alignment film AL2. The liquid crystal layer LQ contains liquid crystal molecules LM. For example, the liquid crystal layer LQ is formed of liquid crystal material whose dielectric anisotropy is positive (posi-type).

A first optical element OD1 is arranged on an external surface 10B of the array substrate AR. The first optical element OD1 is located on a side which faces the backlight unit BL of the liquid crystal display panel LPN, and controls the polarization state of the incident light which enters into the liquid crystal display panel LPN from the backlight unit BL. The first optical element OD1 includes a first polarization plate PL1 having a first polarizing axis AX1. Other optical elements such as a retardation film may be arranged between the first polarization plate PL1 and the first insulating substrate 10.

A second optical element OD2 is arranged on an external surface 20B of the counter substrate CT. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis AX2. Other optical elements such as a retardation film may be arranged between the second polarization plate PL2 and the second insulating substrate 20.

The first polarizing axis AX1 of the first polarization plate PL1 and the second polarizing axis AX2 of the second polarization plate PL2 are arranged in the Crossed Nichol relationship. In the embodiment shown in FIG. 2B, the first polarization plate PL1 is arranged so that the first polarizing axis AX1 is set in parallel with the first direction X, and the second polarization plate PL2 is arranged so that the second polarizing axis AX2 is set in parallel with the second direction Y. In the example shown in FIG. 2C, the second polarization plate PL2 is arranged so that the second polarizing axis AX2 is set in parallel with the first direction X, and the first polarization plate PL1 is arranged so that the first polarizing axis AX1 is set in parallel with the second direction Y.

Next, operation of the liquid crystal display panel LPN with the above-mentioned structure is explained.

At the time of non-electric field state (OFF), i.e., when potential difference (i.e., electric field) is not formed between the pixel electrode PE and the common electrode CE (first common electrode CE1, second common electrode CE2), the liquid crystal molecules LM of the liquid crystal layer LQ are aligned so that their long axes are aligned in the first alignment treatment direction PD1 of the first alignment film AL1 and the second alignment treatment direction PD2 of the second alignment film AL2 as shown with a dashed line in FIG. 2A. The time OFF corresponds to an initial alignment state, and the alignment direction of the liquid crystal molecules LM at the time of OFF corresponds to the initial alignment direction. Herein, the initial alignment direction of the liquid crystal molecules LM means a direction in which orthogonal projection of the long axis of the liquid crystal molecule LM is carried out to the X-Y plane at the time OFF. In addition, the first alignment treatment direction PD1 and the second alignment treatment direction PD2 are in parallel with the second direction Y and the same directions mutually. The liquid crystal molecule LM at the time of OFF are aligned so that the long axis is initially aligned substantially in parallel with the second direction Y as shown with the dashed line in FIG. 2A. That is, the initial alignment direction of the liquid crystal molecule LM is in parallel to the second direction Y.

At the time of OFF, a portion of the backlight from the backlight unit BL penetrates the first polarization plate PL1, and enters into the liquid crystal display panel LPN. The backlight which entered into the liquid crystal display panel LPN becomes linearly polarized light which perpendicularly intersects with the first polarizing axis AX1 of the first polarization plate PL1. The polarization state of the linearly polarized light does hardly change when the backlight passes the liquid crystal layer LQ at the time OFF. For this reason, the linearly polarized light which penetrates the liquid crystal display panel LPN is absorbed by the second polarization plate PL2 which is arranged in the Crossed Nichol locational relationship with the first polarization plate PL1 (black display).

On the other hand, in the state (at the time of ON), i.e., the state where electric field is formed between the pixel electrode PE and the common electrode CE (voltage is impressed to the liquid crystal layer LQ), lateral electric field substantially in parallel with the substrates is formed between the pixel electrode PE and the common electrode CE. The liquid crystal molecule LM is influenced by the electric field between the pixel electrode PE and the common electrode CE, and the alignment state changes. In the embodiment shown in FIG. 2A, in the lower half region between the pixel electrode PE and the second main common electrode CAL2 in the pixel PX, the liquid crystal molecule LM mainly rotates clockwise to the second direction Y, and turns to the lower left in the figure. Furthermore, in the upper half region of the pixel PX, the liquid crystal molecule LM mainly rotates counterclockwise to the second direction Y, and turns to the upper left in the figure. In the lower half region between the pixel electrode PE and the third main common electrode CAR2 in the pixel PX, the liquid crystal molecule LM mainly rotates counterclockwise to the second direction Y, and turns to the lower right in the figure. Furthermore, in the upper half region of the pixel PX, the liquid crystal molecule LM mainly rotates clockwise to the second direction Y, and turns to the upper right in the figure. Thus, in each pixel PX, at the time ON when the electric field is formed between the pixel electrode PE and the common electrode CE, the alignment direction of the liquid crystal molecule is divided into a plurality of directions with respect to the region in which the liquid crystal molecule LM overlaps with the pixel electrode PE 1, and domains are formed corresponding to each alignment direction. That is, a plurality of domains is formed in each pixel PX. Thereby, the transmissive region in which the backlight penetrates is formed between the pixel electrode PE and the common electrode CE in each pixel.

At the time of ON, the polarization state of the linearly polarized light which entered into the liquid crystal display panel LPN changes when passing the liquid crystal layer LQ in accordance with the alignment state of the liquid crystal molecule LM. For this reason, at the time of ON, at least a portion of the backlight which passed the liquid crystal layer LQ penetrates the second polarization plate PL2 (white display). However, in the location in which the liquid crystal molecule overlaps with the pixel electrode PE and the common electrode CE, since the liquid crystal molecule is maintained in the initial alignment state, the state becomes a black display like at time of OFF.

In addition, in the ON state, the pixel potential written in the pixel is held by capacitance CS between the storage capacitance line C1 and the sub-electrode PB.

According to this embodiment, the first main common electrode CA1 counters the source line S interposing the third insulating film 13 in the liquid crystal display device in which the liquid crystal molecules LM are alignment controlled using electric field formed between the pixel electrode PE and the common electrode CE arranged in the array substrate AR. Furthermore, the first main common electrode CA1 is formed more widely than the source line S, and extends to the pixel electrode PE side. For this reason, it becomes possible to shield undesirable leaked electric field penetrating from the source line S to the liquid crystal layer LQ. Therefore, the influence by undesirable electric field is eased in the region close to the source line S in the transmissive domains, and it becomes possible to improve display grace. Furthermore, the first sub-common electrode CB1 faces the gate line G interposing the third insulating film 13. For this reason, it becomes possible to shield undesirable leaked electric field which goes to the liquid crystal layer LQ from the gate line G. Therefore, the influence by undesirable electric field is eased in the region close to the gate line G of the transmissive domains, and it becomes possible to improve display grace.

Moreover, in the pixels adjoining on both sides sandwiching the source line S, even if one pixel is in an ON state and the other pixel is in an OFF state, the liquid crystal molecules LM are maintained in the initial alignment state in a region overlapping with the source line since the first common electrode CE1 and the second common electrode CE2 are set to the same potential. For this reason, even if it is a case where the liquid crystal display panel LPN is observed from a slant direction, it becomes possible to control degradation of the display grace by mixed colors. Moreover, since it becomes unnecessary to expand the width of the black matrix BM for preventing the mixed-colors, it becomes also possible to further expand the area which contributes to the display in one pixel.

In addition, in this embodiment, the counter substrate CT may be equipped with a third common electrode set to the same potential as the second common electrode CE2 interposing the second common electrode CE2 and the liquid crystal layer LQ. Thereby, the liquid crystal molecule LM right above the source line S is maintained in the initial alignment state by an equipotential surface between the second common electrode CE2 and the third common electrode regardless of the ON state and the OFF state, and it becomes possible to control the mixed colors more effectively.

Furthermore, though the first main common electrode CA1 faces the source line S, the third insulating film 13 arranged between the first main common electrode CA1 and the source line S is formed of resin material with a comparatively large thickness. Therefore, it becomes possible to control formation of the undesirable capacitance between the source line S and the first main common electrode CA1, and also to reduce load of the source line S. For this reason, it becomes possible to control the fault of display grace and the increase in power consumption resulting from the load of the source line S.

Moreover, according to this embodiment, the main pixel electrode PA counters the slit SL of the first common electrode CE1. For this reason, in the state of ON, formation of fringe electric field between the pixel electrode PE and the first common electrode CE1 can be controlled. When a positive type liquid crystal material is applied especially, the liquid crystal molecule LM rises by electric field ingredient of the fringe electric field perpendicular to the principal surface of the substrate, and aligns perpendicularly with respect to the principal surface of the substrate. Since the domain where the liquid crystal molecule LM rose perpendicularly does not contribute to modulation of the liquid crystal layer LQ, the liquid crystal molecule LM does not contribute to the display in the ON state, which results in decrease in transmissivity in the region close to the pixel electrode PE. According to this embodiment, a lateral electric field is formed between the pixel electrode PE and the second common electrode CE2 in parallel with the principal surface of the substrate in the ON state, and the liquid crystal molecule LM are mainly alignment controlled by the lateral electric field while electric field formed between the pixel electrode PE and first common electrode CE1 also becomes substantially in parallel with the principal surface. For this reason, it becomes possible to control the rising of the liquid crystal molecule LM. Therefore, in the region close to the pixel electrode PE, since the liquid crystal molecule LM can contribute to the display, it becomes possible to control decrease in the transmissivity.

As described above, the second common electrode CE2 is necessary to form electric field for controlling alignment of the liquid crystal molecule LM between the pixel electrodes PE and the second common electrode CE2. In this embodiment, in order to form a plurality of domains in one pixel, it is preferable to arrange the second common electrode CE2 in each angle portion of the pixel PX while the pixel electrode PE is formed in the cross shape. That is, the second common electrode CE2 has a function which strengthens electric field which divides the alignment direction of the liquid crystal molecule LM in one pixel. The second common electrode CE2 is formed so that the second common electrode CE2 may have width and length required for forming such electric field. As one example, width of the second main common electrode CA2 may be equal to or less than the width of the source line S. Similarly, the width of the second sub-common electrode CB2 may be equal to or less than the width of the gate line G. In addition, the second sub-common electrode CB2 may break off right above the gate line G.

In addition, since the first common electrode CE1 is formed with a transparent electric conductive material, even if the first common electrode CE1 extends between the pixel electrode PE and the second common electrode CE2 in the X-Y plane, the first common electrode CE1 does not result in the decrease of transmissivity. For this reason, while the slit SL is formed in the first main common electrode CA1 for controlling formation of fringe electric field, the first main common electrode CA1 is formed so that the first main common electrode CA1 may have sufficient width to shield leaked electric field from the source line S.

Next, other embodiments are explained.

Figure 5:
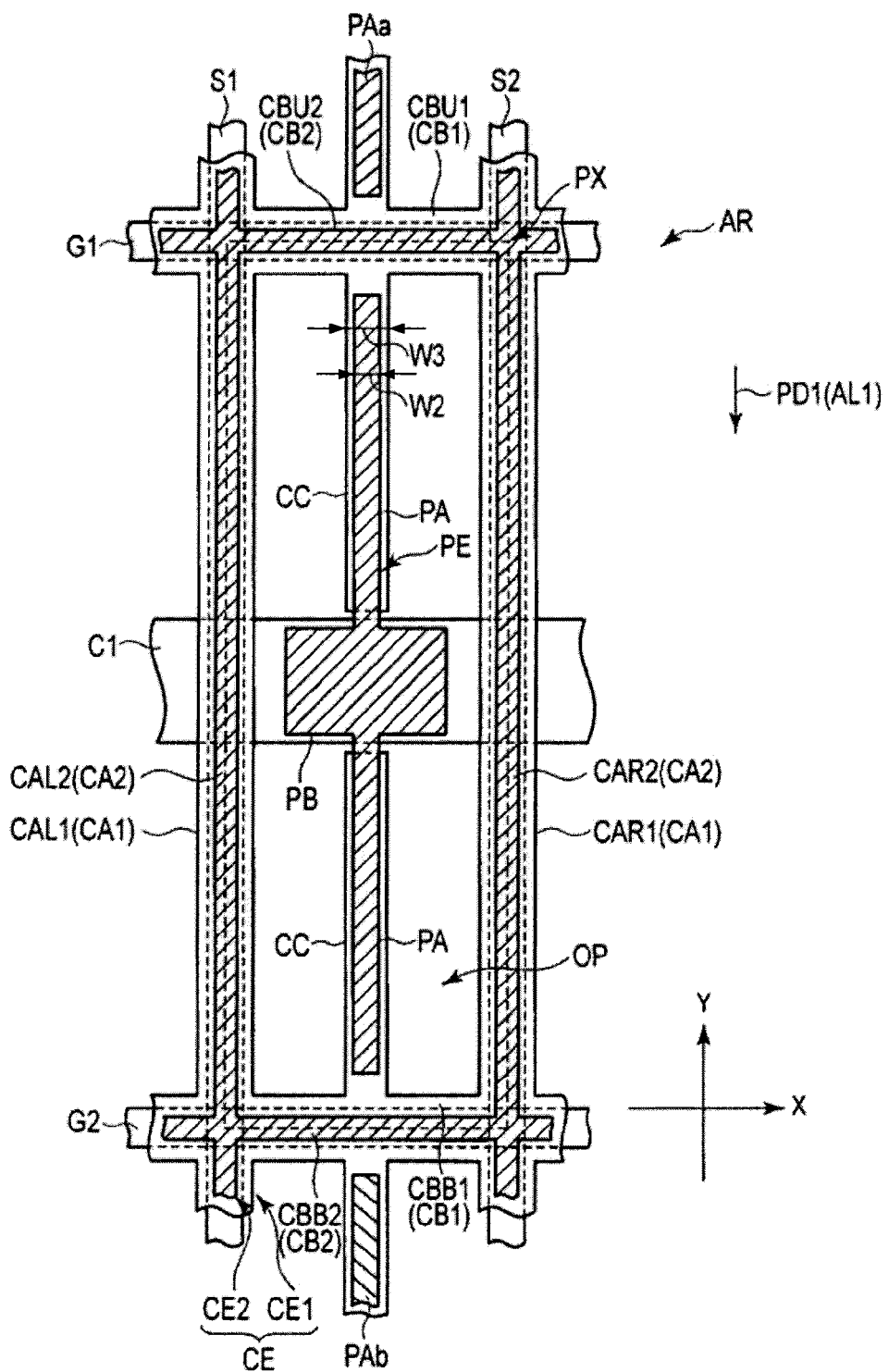
FIG. 5 is a plan view schematically showing the structure of one pixel PX when an array substrate AR shown in FIG. 1 is seen from a counter substrate side according to a second embodiment.

FIG. 5 is a plan view schematically showing the structure of one pixel PX when an array substrate AR shown in FIG. 1 is seen from a counter substrate side according to a second embodiment.

The structure according to the second embodiment shown here is different from the first embodiment shown in FIG. 2 in that the first common electrode CE1 includes a capacitance portion CC extending in the second direction Y, and that the main pixel electrode PA counters the capacitance portion CC.

The first common electrode CE1 includes a first main common electrode CAL1 facing the source line S1, a first main common electrode CAR1 facing the source line S2, a capacitance portion CC located approximately in the center between the first main common electrode CAL1 and the first main common electrode CAR1, a first sub-common electrode CBU1 facing the gate line G1 and a first sub-common electrode CBB1 facing the gate line G2. The capacitance portion CC breaks off in the central portion, i.e., the region in which the storage capacitance line C1 overlaps with the sub-pixel electrode PB in the pixel PX, and is connected with the first sub-common electrode CBU1 and the first sub-common electrode CBB1. That is, an opening OP in a H shape is formed in the first common electrode CE1 in each pixel PX.

The second common electrode CE2 includes a second main common electrode CAL2 facing the main common electrode CAL1, a second main common electrode CAR2 facing the first main common electrode CAR1, a second sub-common electrode CBU2 facing the first sub-common electrode CBU1 and a second sub-common electrode CBB2 facing the sub-common electrode CBB1.

According to the second embodiment, in addition to obtain the same effect as the first embodiment, it becomes possible to form capacitance CS not only between the storage capacitance line C1 and the sub-pixel electrode PB but between the capacitance portion CC and the main pixel electrode PA. The width W2 of the main pixel electrode PA and the width W3 of the capacitance portion CC in the first direction X can be suitably set up with the size of capacitance required for one pixel. In addition, it is preferable to make the width W3 of the capacitance portion CC substantially equal to the width W2 of the main pixel electrode PA. In this example, although the width W3 is larger than the width W2, it is preferable that the capacitance portion CC does not extend beyond the portion overlapping with the pixel electrode PE in the first direction X in the X-Y plane so that the formation of the fringe electric field is suppressed between the pixel electrode PE and the first common electrode CE1 in the circumferences of the pixel electrode PE. In addition, since the first common electrode CE1 and the pixel electrode PE are formed by patterning different layers, respectively, it is accepted that the width of one of the first common electrode CE1 and the pixel electrode PE is made slightly larger than the other considering mask miss-alignment.

Figure 6:
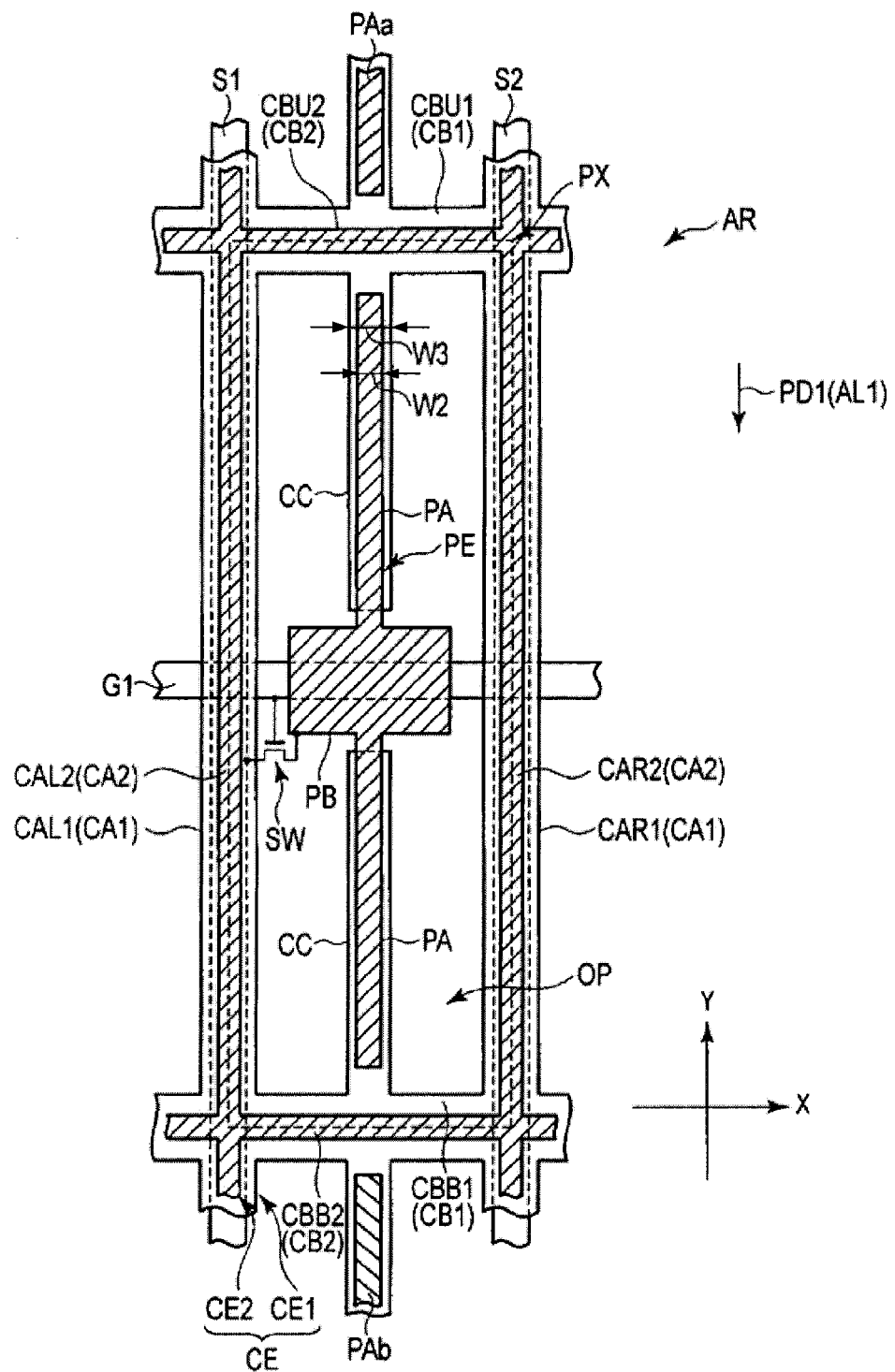
FIG. 6 is a plan view schematically showing the structure of one pixel PX when an array substrate AR shown in FIG. 1 is seen from a counter substrate side according to other embodiment.

FIG. 6 is a plan view schematically showing the structure of one pixel PX when an array substrate AR shown in FIG. 1 is seen from a counter substrate side according to other embodiment.

The structure shown here is different from the embodiment shown in FIG. 5 in that the storage capacitance line is omitted, and that the gate line G1 crosses the central portion of the pixel PX.

That is, the first common electrode CE1 includes a first main common electrode CAL1 facing the source line S1, a first main common electrode CAR1 facing the source line S2, a capacitance portion CC located in the approximately middle between the first main common electrode CAR1 and the first main common electrode CAL1, a first sub-common electrode CBU1 located in the upper end portion, i.e., between a main pixel electrode PA and a main pixel electrode PAa of the pixel PX, and the first sub-common electrode CBB1 located in the bottom end portion, i.e., between a main pixel electrode PA and a main pixel electrode PAb of the pixel PX.

In this embodiment, the capacitance CS in each pixel PX is formed between the capacitance portion CC and the main pixel electrode PA.

The switching element SW electrically connected with the gate line G1 and the source line S1 is formed in the central portion of the pixel PX, and electrically connected with the pixel electrode PE. The width of the gate line G1 in the second direction Y can be made smaller than the width of the storage capacitance line C1 in the second direction Y shown in FIG. 5. In addition, the width of the sub-pixel electrode PB in the second direction Y can be made small in the range in which electric connection with the switching element SW is enabled.

According to the above structure, in addition to obtain the same effect as the second embodiment, it becomes possible to expand the area of the transmissive domain in one pixel which contributes to the display by omitting the storage capacitance line and reducing the size of the sub-pixel electrode. For this reason, according to this embodiment, as compared with the embodiment shown in FIG. 5, it becomes possible to improve the transmissivity in one pixel.

Figure 7:
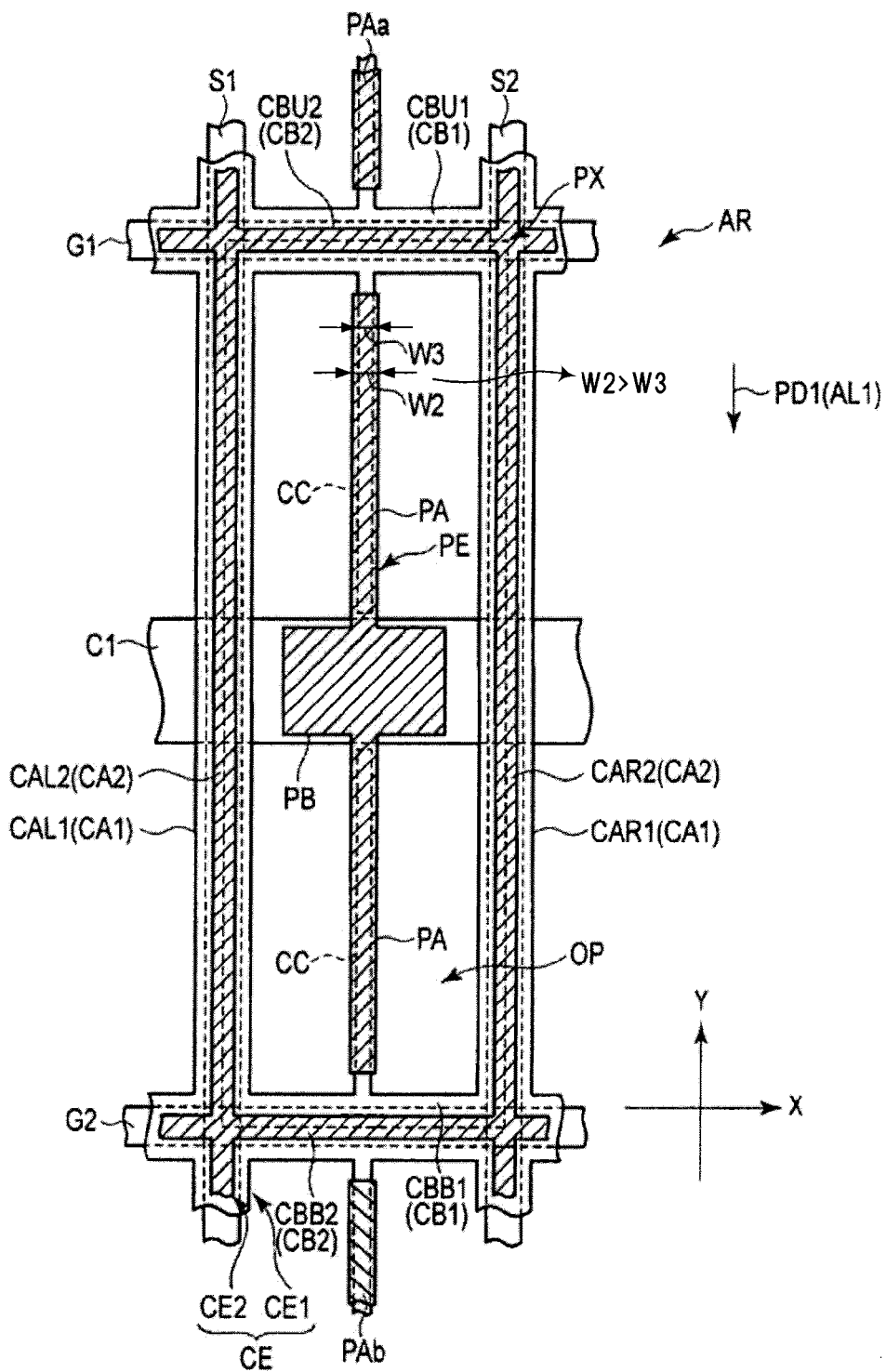
FIG. 7 is a plan view schematically showing the structure of one pixel PX when an array substrate AR shown in FIG. 1 is seen from a counter substrate side according to other embodiment.

FIG. 7 is a plan view schematically showing the structure of one pixel PX when an array substrate AR shown in FIG. 1 is seen from a counter substrate side according to other embodiment.

The structure shown here is different from the embodiment shown in FIG. 5 in that the width W2 of the main pixel electrode PA is larger than width W3 of the capacitance portion CC. The capacitance CS in each pixel PX is formed, respectively, between the storage capacitance line C1 and the sub-electrode PB and between the capacitance portion CC and the main pixel electrode PA.

Also in the above structure, the same effect as the embodiment shown in FIG. 5 is acquired.

Figure 8:
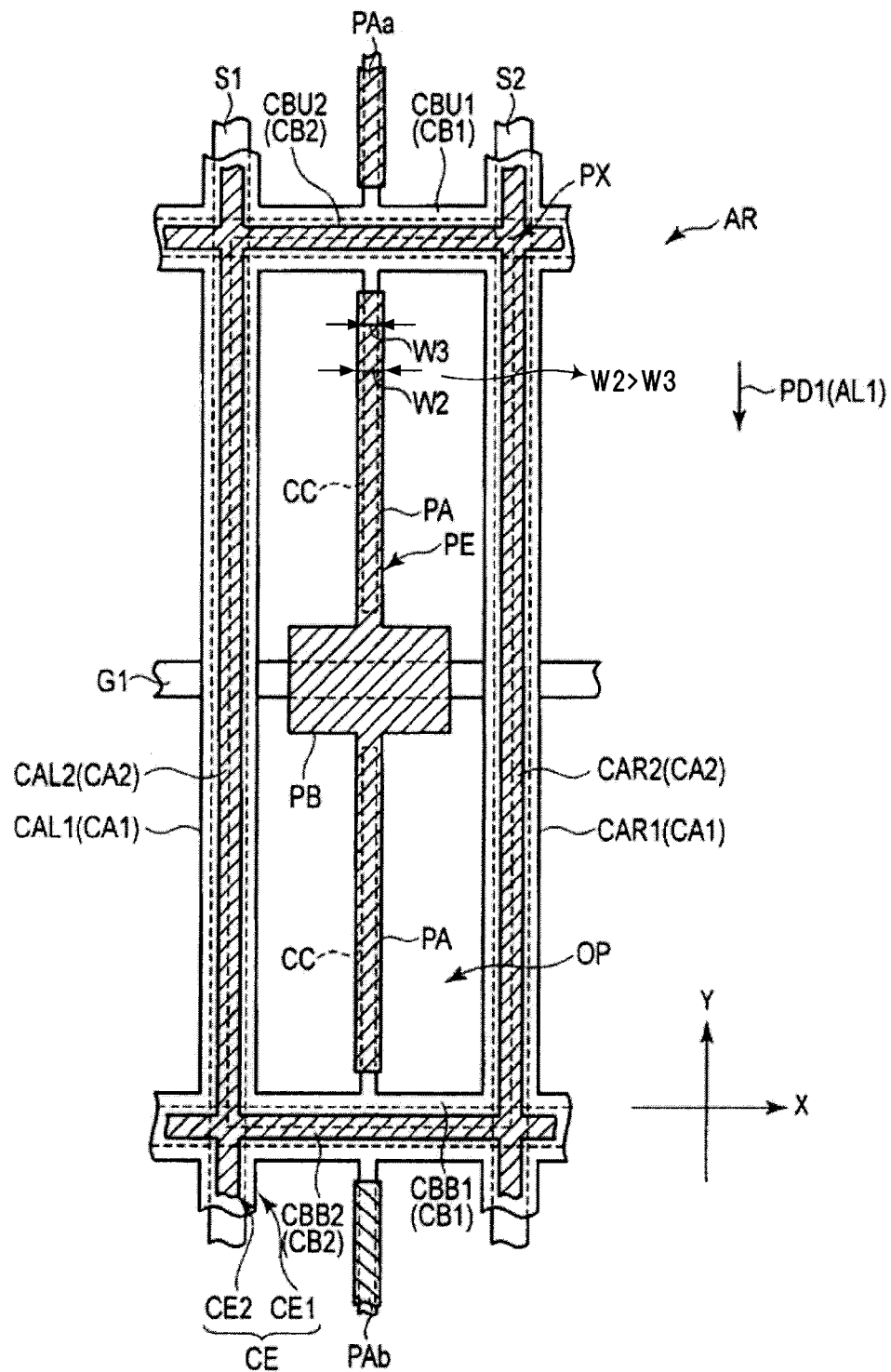
FIG. 8 is a plan view schematically showing the structure of one pixel PX when an array substrate AR shown in FIG. 1 is seen from a counter substrate side according to other embodiment.

FIG. 8 is a plan view schematically showing the structure of one pixel PX when an array substrate AR shown in FIG. 1 is seen from a counter substrate side according to other embodiment.

The structure shown here is different from the structure shown in FIG. 6 in that the width W2 of the main pixel electrode PA is larger than the width W3 of the capacitance portion CC. The capacitance CS in each pixel PX is formed, respectively, between the capacitance portion CC and the main pixel electrode PA.

Also in the above embodiment, the same effect as the embodiment shown in FIG. 6 is acquired.

As explained above, according to the embodiments, the liquid crystal display device which is capable of improving display grace can be supplied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
a first substrate including;
a gate line extending in a first direction,
a source line extending in a second direction crossing the first direction,
a first interlayer insulating film arranged on the gate line and the source line,
a first common electrode including a first sub-common electrode facing the gate line and a first main common electrode facing the source line extending on the first interlayer insulating film, the first common electrode having a slit extending in the second direction,
a second interlayer insulating film covering the first common electrode,
a main pixel electrode extending in the second direction on the second interlayer insulating film so as to face the slit, and
a second common electrode including a second sub-common electrode facing the first sub-common electrode and a second main common electrode facing the first main common electrode extending on the second interlayer insulating film, the second common electrode being set to the same potential as the first common electrode,
a second substrate facing the first substrate; and
a liquid crystal layer held between the first substrate and the second substrate.

2. The liquid crystal display device according to claim 1, wherein the width of the slit includes a first width in the first direction, and the main pixel electrode includes a second width smaller than the first width.

3. The liquid crystal display device according to claim 1, wherein the first substrate includes a storage capacitance line extending in the first direction and a sub-pixel electrode electrically coupled with the main pixel electrode and extending in the first direction so as to face the storage capacitance line.

4. The liquid crystal display device according to claim 1, wherein
the first main common electrode faces the source line having a width larger than the width of the source line in the first direction,
the width of the second main common electrode is smaller than the width of the first main common electrode in the first direction, and
the width of the second sub-common electrode is smaller than the width of the first sub-common electrode in the first direction.

5. The liquid crystal display device according to claim 1, wherein the first interlayer insulating film is formed of resin material.

6. A liquid crystal display device, comprising:
a first substrate including;
first and second gate lines extending in a first direction,
first and second source lines extending in a second direction crossing the first direction,
a storage capacitance line arranged between the first and second gate lines extending in the first direction,
a first interlayer insulating film arranged on the first and second gate lines, and the first and the second source lines,
a first common electrode including a first sub-common electrode facing the first and second gate lines, respectively, and a first main common electrode facing the first and second source lines, respectively, extending on the first interlayer insulating film, the first common electrode having a slit extending in the second direction, a second interlayer insulating film covering the first common electrode, a main pixel electrode extending in the second direction on the second interlayer insulating film so as to face the slit, a sub-pixel electrode electrically coupled with the main pixel electrode and extending in the first direction, the sub-pixel electrode facing the storage capacitance line, and a second common electrode including a second sub-common electrode facing the first sub-common electrode and a second main common electrode facing the first main common electrode, respectively extending on the second interlayer insulating film, the second common electrode being set to the same potential as the first common electrode, a second substrate facing the first substrate; and a liquid crystal layer held between the first substrate and the second substrate, wherein the first main common electrode extends from locations on the first and second source lines to the main pixel side respectively, partially overlapping the sub-pixel electrode so as to form the slit, and the first main common electrode is formed of a transparent conductive material.

7. The liquid crystal display device according to claim 6, wherein the width of the slit includes a first width in the first direction, and the main pixel electrode includes a second width smaller than the first width.

8. The liquid crystal display device according to claim 6, wherein the first interlayer insulating film is formed of resin material.

9. The liquid crystal display device according to claim 6, wherein the first main common electrode faces the first and second source lines having a width larger than the width of the first and second source lines in the first direction, the width of the second main common electrode is smaller than the width of the first main common electrode in the first direction, and the width of the second sub-common electrode is smaller than the width of the first sub-common electrode in the first direction.

10. A liquid crystal display device, comprising:

a first substrate including;

a gate line extending in a first direction, a source line extending in a second direction crossing the first direction, a first interlayer insulating film arranged on the gate line and the source line, a first common electrode including a first main common electrode facing the source line and a capacitance portion extending in the second direction on the first interlayer insulating film, a second interlayer insulating film covering the first common electrode, a main pixel electrode extending in the second direction on the second interlayer insulating film so as to face the capacitance portion, and a second common electrode including a second main common electrode facing the first main common electrode on the second interlayer-insulating film and set to the same potential as the first common electrode, a second substrate facing the first substrate; and a liquid crystal layer held between the first substrate and the second substrate, wherein the first common electrode includes a first sub-common electrode extending in the first direction on the first interlayer insulating film and electrically coupled with the capacitance portion, and the second common electrode includes a second sub-common electrode facing the first sub-common electrode on the second interlayer insulating film.

11. The liquid crystal display device according to claim 10, wherein the capacitance portion includes a first width in the first direction, and the main pixel electrode includes a second width substantially the same as the first width.

12. The liquid crystal display device according to claim 10, wherein the first sub-common electrode faces the gate line.

13. The liquid crystal display device according to claim 10, wherein the first interlayer insulating film is formed of resin material.

* * * * *